United States Patent
Vann

[19]

[11] Patent Number: 6,017,125
[45] Date of Patent: Jan. 25, 2000

[54] BAR CODED RETROREFLECTIVE TARGET

[75] Inventor: Charles S. Vann, Fremont, Calif.

[73] Assignee: The Regents of the University of California, Oakland, Calif.

[21] Appl. No.: 08/928,243

[22] Filed: Sep. 12, 1997

[51] Int. Cl.[7] .......................... G02B 5/122; H04B 10/00; G06K 7/10

[52] U.S. Cl. ......................... 359/529; 235/462; 250/568; 359/169

[58] Field of Search .................................... 250/566, 568; 359/529, 169; 235/462

[56] References Cited

U.S. PATENT DOCUMENTS

| | | | |
|---|---|---|---|
| 4,099,591 | 7/1978 | Carr | 180/98 |
| 4,658,147 | 4/1987 | Eldering | 250/566 |
| 5,237,164 | 8/1993 | Takada | 235/487 |
| 5,348,249 | 9/1994 | Gallivan | 244/3.11 |

Primary Examiner—Stephen C. Buczinski
Attorney, Agent, or Firm—John P. Wooldridge

[57] ABSTRACT

This small, inexpensive, non-contact laser sensor can detect the location of a retroreflective target in a relatively large volume and up to six degrees of position. The tracker's laser beam is formed into a plane of light which is swept across the space of interest. When the beam illuminates the retroreflector, some of the light returns to the tracker. The intensity, angle, and time of the return beam is measured to calculate the three dimensional location of the target. With three retroreflectors on the target, the locations of three points on the target are measured, enabling the calculation of all six degrees of target position. Until now, devices for three-dimensional tracking of objects in a large volume have been heavy, large, and very expensive. Because of the simplicity and unique characteristics of this tracker, it is capable of three-dimensional tracking of one to several objects in a large volume, yet it is compact, light-weight, and relatively inexpensive. Alternatively, a tracker produces a diverging laser beam which is directed towards a fixed position, and senses when a retroreflective target enters the fixed field of view. An optically bar coded target can be read by the tracker to provide information about the target. The target can be formed of a ball lens with a bar code on one end. As the target moves through the field, the ball lens causes the laser beam to scan across the bar code.

4 Claims, 6 Drawing Sheets

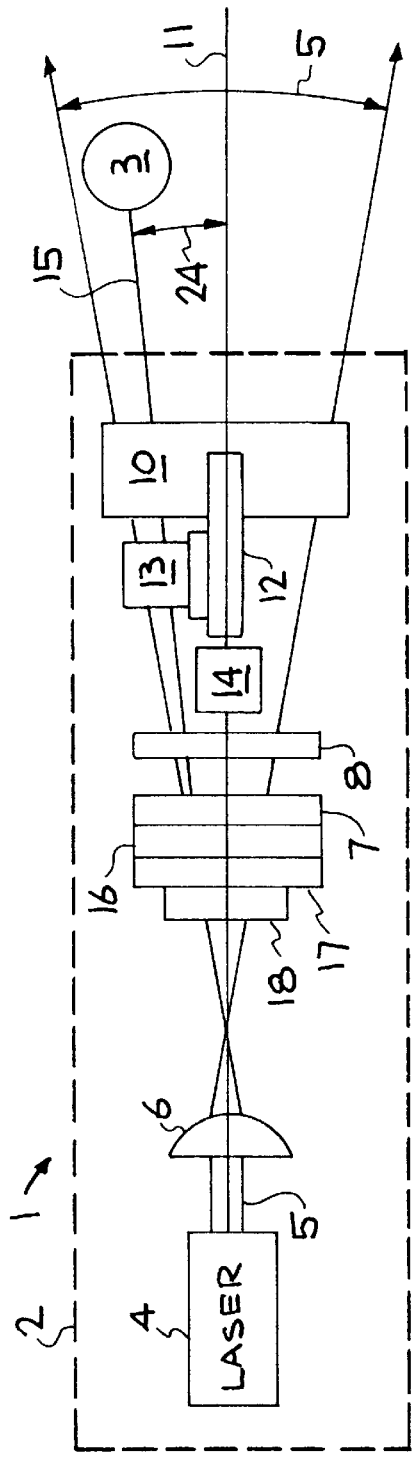
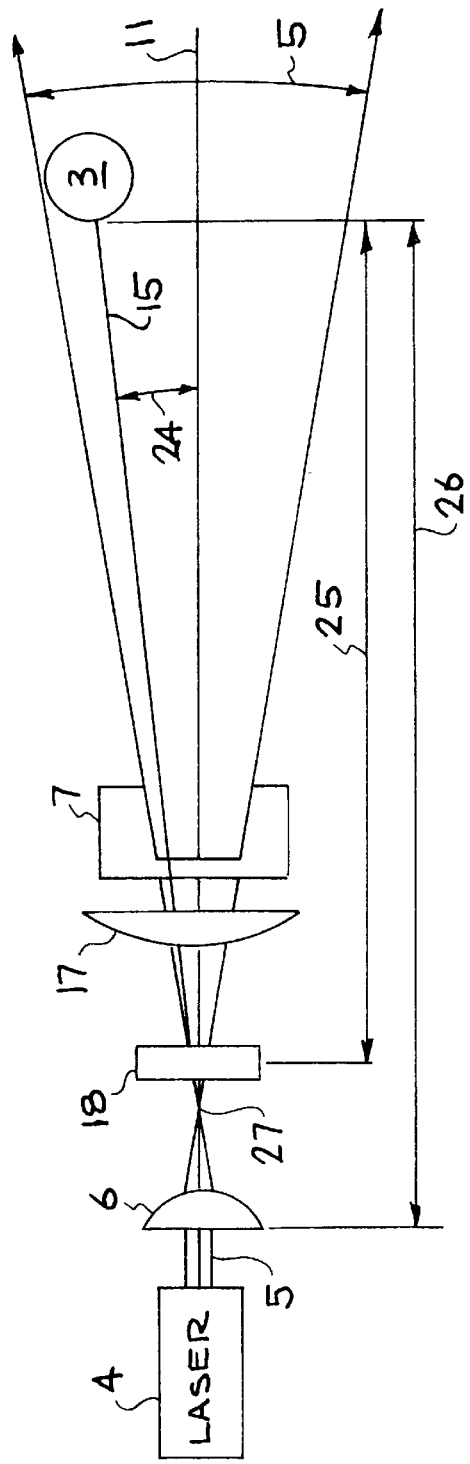
FIG. 1B
FIG. 2

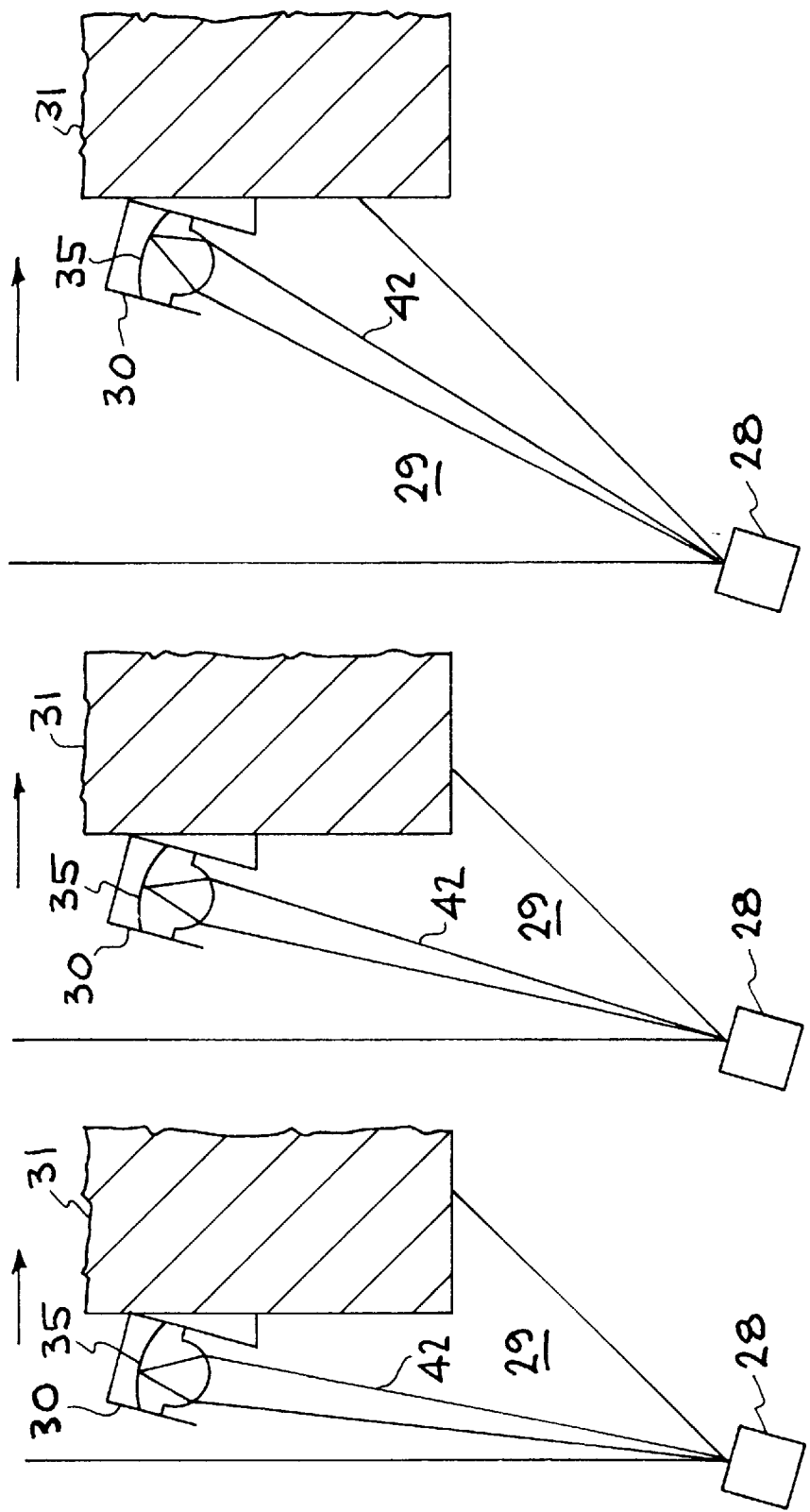

BAR CODED RETROREFLECTIVE TARGET

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to detecting the location of and identifying a target relative to the position of a tracking device, and more specifically, it relates to target configuration.

2. Description of Related Art

The ability to track the unpredictable path of objects or locate the position of objects within a three-dimensional space has many applications. This can range from merely identifying arrival at a particular location, to obtaining additional information about the target, to finding the position of a stationary object at an unknown position, to actively following the position of a moving object as it moves. For example, tracking people would enable their motions to be simulated and analyzed in software, which could be used for a wide variety of applications, including providing valuable information for physical therapy or for virtual reality games. Located on cars, a tracking sensor could provide the location of the car relative to the road, warning the driver of danger. Conversely, the tracker could be on the road, illuminating targets on cars which return information indicating presence or on the type, license, etc., of the car. Other examples include tracking the path of an instrument as it is inserted into a hazardous area or following an automated manufacturing tool as it manipulates a part. In a highly automated industrial environment, tools are often left to perform their functions with little or no feedback as to their performance. Costly mistakes can result when a tool or item is placed in the wrong location. One way of avoiding the mis-location of objects is to track their locations with a sensor.

There are many different types of sensors (laser, magnetic, ultrasound, etc.) which can provide information on the location of an object. Most of those sensors provide information on only one dimension, usually range. While range information can be very useful, it is inadequate to monitor objects with multi-dimensional freedom of motion. To track several axes of motion, several range sensors can be combined to provide more degrees of information, but generally this is impractical, adding cost and difficulty in maintaining orthogonality between the sensors. Some sensors provide more than one degree of information. Several types provide two dimensional information, e.g. a camera which locates lateral position of an object in some limited field of view. Only a few provide information in three dimensions (lateral translation and range). These three dimensional (3-D) sensors generally use a laser to scan a field-of-view, collecting diffuse light to compute a 3-D image of objects. These types of sensors are good for identifying the type and orientation of objects, but they are hardware and software intensive, making them slow and expensive for target tracking. Because they use diffuse reflectors, their range is limited to tracking objects in small volumes.

A laser coordinate measurement system is a fast and accurate 3-D tracker. It tracks a special retroreflector target (cooperative target) with one to several lasers, obtaining accuracies of a few micrometers in a large volume (many cubic meters), but these devices can be very expensive (>$100,000) and large (>1 cubic foot). Furthermore, a coordinate measurement system must record a starting reference point to achieve high accuracy, which may be impractical in many applications. Another draw back of this type sensor is its inability to track more than one target at a time.

SUMMARY OF THE INVENTION

Accordingly it is an object of the invention to provide targets for use with small, inexpensive, non-contact laser trackers.

It is also an object of the present invention to provide improved retroreflective targets.

It is another object of the invention to provide a target which contains coded information.

The present invention is a small, inexpensive, non-contact laser sensor which tracks retroreflectors fixed to a target, and a particular type of retroreflective target for use with the tracker. The tracker includes a laser which produces an output beam. The beam passes through a linear polarizer tilted at an angle so that the beam has a linear polarization. The beam then passes through a quarater wave plate to produce a beam with circular polarization. The beam passes through an optical system to the target and a reflected beam is directed back through the quarter wave plate to produce a linear polarization orthogonal to the initial polarization so that the beam cannot pass back through the polarizer but is instead reflected to a detector.

In one embodiment, the tracker's laser beam is formed into a plane of light which is swept across a space of interest. When the beam illuminates a retroreflector on the target, some of the light returns to the tracker. The intensity, angle, and time of the return beam is measured to calculate the three dimensional location of the target. With three retroreflectors on the target, three points on the target are measured, enabling the calculation of all six degrees of target position. Furthermore, this sensor is capable of tracking more than one target at a time.

In another embodiment, the tracker produces a diverging laser beam which is directed towards a fixed position and senses when an optically bar coded retroreflective target enters its field of view. The target can be formed of a ball lens with a bar code on one end; as the target moves through the field the ball lens causes the laser beam to scan across the bar code.

Until now, devices for three-dimensional tracking of objects in a large volume have been heavy, large, and very expensive. Because of the simplicity and unique characteristics of this tracker, it is capable of three-dimensional tracking of one to several objects in a large volume yet it is compact, light-weight, and relatively inexpensive.

BRIEF DESCRIPTION OF THE DRAWINGS

FIGS. 1A, 1B are top and side views of a miniature laser tracker.

FIG. 2 shows how the position sensor detects the out of plane angle of the target.

FIGS. 7A, 7B, 7C show different positions of an optically bar coded target moving through the diverging laser beam of the tracker in the system of FIG. 3.

DETAILED DESCRIPTION OF THE INVENTION

Figure 1A:
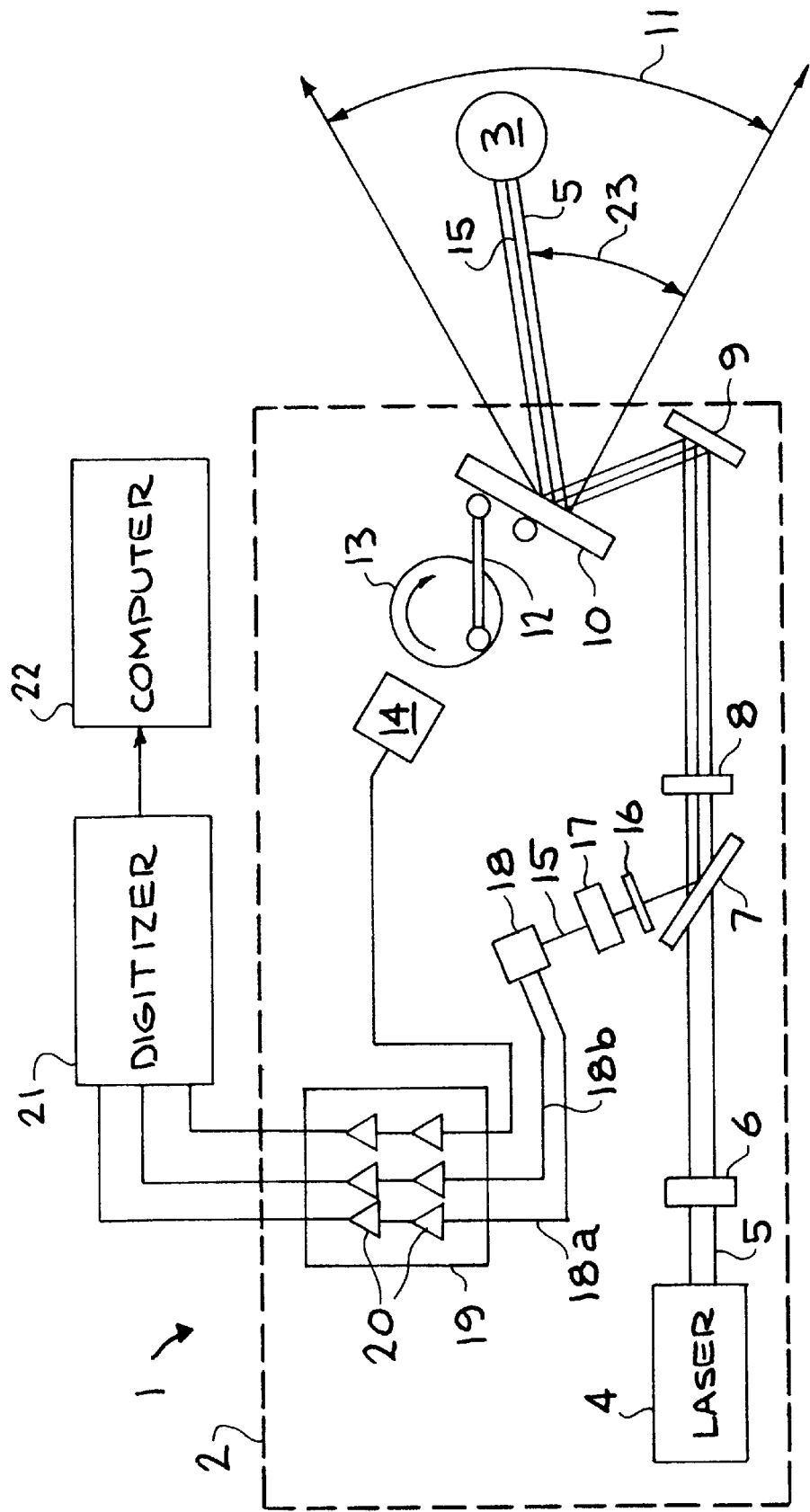

The miniature laser tracker (MLT) is a small, non-contact sensor which detects the motion of one or multiple cooperative targets in three dimensions. As shown in FIGS. 1A–B, the MLT 1 is contained in a single box 2 and detects a retroreflector target 3 by illuminating it with a scanned laser beam 5. Major components of the tracker are a laser 4, cylindrical lenses 6 and 17, a polarizer 7, a quarter wave plate 8, a scanning mirror 10, a proximity sensor 14, an optical bandpass filter 16, a photodetector 18, and signal processing system 19–22.

The laser 4 produces an output beam 5 which can be either pulsed or continuous wave. A preferred laser is a diode laser. The output beam 5 can be randomly polarized but MLT 1 will operate most efficiently when the output beam is linearly polarized and oriented to pass through the polarizer 7. Next, the beam is passed through a cylindrical lens 6 which diverges the beam in one dimension but not in the other. Next, the beam passes through a linear polarizer 7 which is tilted relative to the beam direction. To minimize reflectivity loss, the polarizer 7 can be tilted at Brewster's angle. Only one orientation of linearly polarized light will pass through the polarizer 7. The beam then passes through a quarter wave plate 8 which converts the light from linearly polarized to circularly polarized. A mirror 9 directs the beam to a scanning mirror 10 which directs the illumination beam 5 back and forth through a prescribed plane 11 (scanning plane).

The scanning motion of the mirror 10 is implemented with a bar 12 attached off axis to a rotary motor 13. Every full rotation of the motor 13 moves the scanning mirror 10 back and forth once. A proximity sensor 14 records when the bar is closest to it, indicating the start of a new motor revolution. Of course, other mechanical arrangements for scanning the illumination beam over the target area can be used.

A cooperative target 3 located in the scanned volume will reflect a portion of the illumination beam 5 back to the tracker 1 as a reflected beam 15. However, the beam will continue to diverge, even after reflection. The cooperative target 3 is a retroreflector, e.g. a reflective sphere or retromirror combination (corner cube). The tracker 1 is capable of locating multiple targets but tracking only one at a time is discussed below.

When the reflected beam 15 reflects from the target 3, it retraces the path of the illuminating beam 5 to include changing back to linearly polarized light when it passes through the quarter-wave plate 8. However, because the light has been retro-reflected, the angle of polarization is rotated by 90 degrees relative to the illumination beam 5. Consequently, the reflected beam 15 does not have the right polarization to transmit back through the polarizer 7, reflecting to another path instead. This new path preferably contains an optical bandpass filter 16 which passes the laser light but rejects light of other wavelengths. The light transmitted through the filter 16 passes through a cylindrical lens 17 which compensates the divergence to focus the reflected beam 15 onto a photodetector 18. The photodetector 18 could be a position sensitive detector (PSD), an array of photodiode elements, or a camera; however, a PSD is used in this example.

The PSD 18 measures the timing, amount of light, and the out-of-plane angular deviation of the reflected beam 15. When voltage is applied to a one-dimensional PSD 18, it generates two electrical outputs, one on each output lead 18$a$, $b$ of PSD 18. The current of these outputs is proportional to the intensity and position of the light on the detector. The PSD 18 is a silicon chip which generates current relative to the illumination intensity and distribution on the chip. If the position of the light is non-symmetric on the chip, the current from one end of the PSD 18 will be greater than the current coming from the other end. That imbalance can be computed into beam position information. Furthermore the sum of the currents from both ends indicates the total energy on the chip. In the signal processor 19, the two current outputs from the PSD 18 are converted to voltage outputs and amplified by operational amplifiers 20. The amplified voltages are fed into a digitizer 21 which feeds the digital information into a computer 22 where the data is interpreted in software.

The computer 22 calculates the three dimensional position of the target 3 by software manipulation of the two outputs from the PSD 18 and the output from the proximity sensor 14, computing polar coordinates (range and two angles) of the target.

Range is computed by summing the two PSD voltages to determine the total energy of the reflected beam at the PSD 18. The ratio of reflected beam 15 energy to the illumination beam 5 energy provides a measurement of range. This is possible because the illumination beam 5 diverges and its energy per area decreases with distance. Since the area of the target 3 does not change, the amount of reflected beam 15 energy collected by the PSD 18 directly indicates the distance of the target.

The in-plane angle of the target is determined by comparing the times of the arrival of the peak signal from the proximity sensor 14 and the arrival of the reflected beam 15 to the PSD 18. The peak signal from the proximity sensor 14 indicates the start of a motor cycle and a new beam scan. The angle of the scanning mirror 10 (and therefore the angle 23 of the target 3 in the scanning plane 11) is calculated by interpolating between the start of a cycle and the time the reflected beam 15 arrives at the PSD 18.

The out-of-plane angle of the target 3 is computed with a ratio of the two outputs from the PSD 18 to determine the location of the reflected beam 15 on the PSD 18. If the focus of the reflected beam 15 location is at the center of the PSD 18, it means the target 3 is exactly in the scanning plane 11, i.e. zero degrees out-of-plane angle. However, if the focus of the reflected beam 15 is offset from the center of the PSD 18, it is a proportional measurement of the angle 24 at which the target 3 is out of the scanning plane 11. This sensitivity is possible because the reflected beam 15 is diverted to a different and shorter path 25 than illuminating beam path 26 as shown in FIG. 2. In other words, the cylindrical lens 17 focuses the reflected beam 15 along a line (the sensitive axis of the PSD 18) rather than a single focal point (the point of divergence 27), and how far off-center the reflected beam focuses from the center of the PSD 18 is proportional to the out-of-plane angle 24 of the target 3.

The range and two angles uniquely locate the target 3 in the scanned volume. These polar coordinates can easily be converted in software to Cartesian coordinates if desired.

With the arrangement described above, the unique location of multiple targets can be detected as long as their scanning angles 23 are distinct. If the targets have the same in-plane scanning angle 23, the two reflected beams 15 and 15' will simultaneously illuminate the PSD 18, causing errors in calculating range and out-of-plane 24 displacement. Therefore, an alternative configuration should be used for more than one target at the same scanning angle.

If two or more targets 3 are expected to be at the same scanning angle 23, then photodetector 18 should be an array of photodetector elements rather than a single PSD. With each photodetector element independently light sensitive, the position of the reflected beam 15 is determined by which photodetector element is illuminated (the same as pixels in a CCD camera). Because each photodetector element is independent, several can be illuminated at the same time without interfering, i.e. the out-of-plane angle 24 and range can be determined for several targets 3 even when those targets 3 are at the same scanning angle 23. Generally, the out-of-plane angle 24 resolution will be less than with a single PSD. That resolution is determined by the size of the photodetector elements, and the field of view is determined by the number of elements in the array.

Another practical modification of the scanning system is to change the dimension in which the illumination beam 5 diverges. As described above, the illumination beam 5 diverges perpendicular to the scanning plane 11. However, the illumination beam 5 could instead diverge within the scanning plane 11. This limits the volume scanned to the height of the illumination beam 5, which may be advantageous in some cases.

Figure 3:
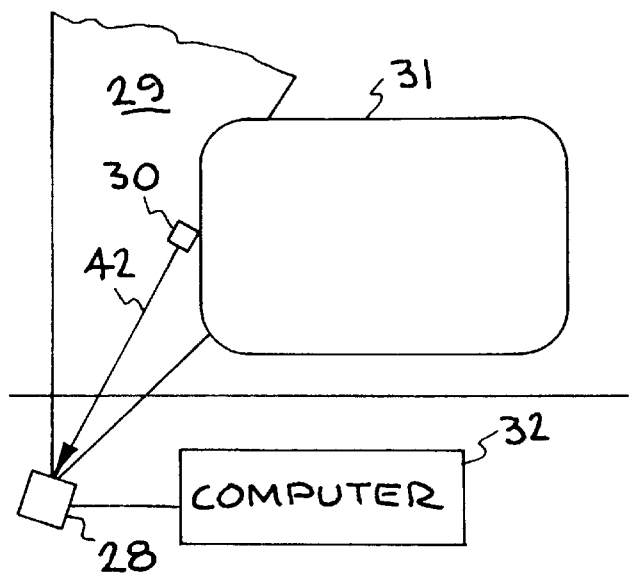
FIG. 3 shows a system using a miniature laser tracker for reading a optically bar coded target on a moving object.

As shown in FIG. 3, an alternative miniature laser tracker (MLT) 28 produces a diverging laser beam 29 to illuminate an optically bar coded, retroreflective target 30 on a moving object 31, for example an automobile. The reflected beam 42 to MLT 28 instantly provides information on the object to a computer 32. In the future, cars, boats, boxes on a conveyor belt, and other objects could have a small optically bar coded target 30 mounted on them which stores digital information about the object. For example, an optically bar coded target mounted on a car could digitally store the car's license plate number, registration, insurance, make, model, and color, i.e. it would provide an optically readable digital license plate. Of course, the bar coded feature can be omitted and the retroreflected beam used merely to detect the presence of the target in the field.

While the MLT 27 of FIGS. 1A, B produces a diverging light plane 5 which is swept in a direction perpendicular to plane 11 in order to locate a target 3 in an unknown position, MLT 28 of FIG. 3 produces a diverging beam 29 in a fixed position which identifies a target 30 which enters the fixed beam 29. Thus, MLT 28 does not have to locate target 30 since target 30 finds MLT 28. Since MLT 28 does not have to scan a field, the tracker is somewhat simplified. However, as will become apparent from the description of a particular embodiment of MLT 28 with respect to FIG. 6, MLT 28 utilizes many of the same components and principles as the scanning, object locating MLT 27. MLT 28 is adapted for specific applications in tracking objects which pass through a fixed location. A wide variety of information can be obtained, from mere presence of an object by sensing a reflected beam, to much information about the target by including bar coded information on the target.

The retroreflector target 30 with optical bar code differs from existing bar codes because it contains optics making it a specular retroreflector rather than a diffuse reflector. As a specular retroreflector, far more laser light returns to the photodetector, allowing for eye-safe operation even at long distances between the bar code and the laser. Furthermore, since the object moves through the beam, the laser beam is not scanned in this approach, simplifying the tracker design.

Figure 4:
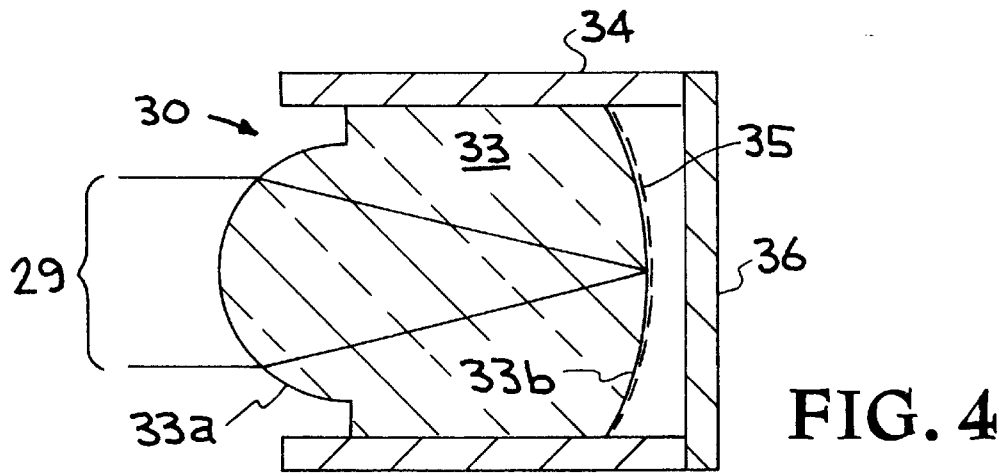
FIG. 4 shows a retroreflective target containing an optical bar code.
Figure 5:
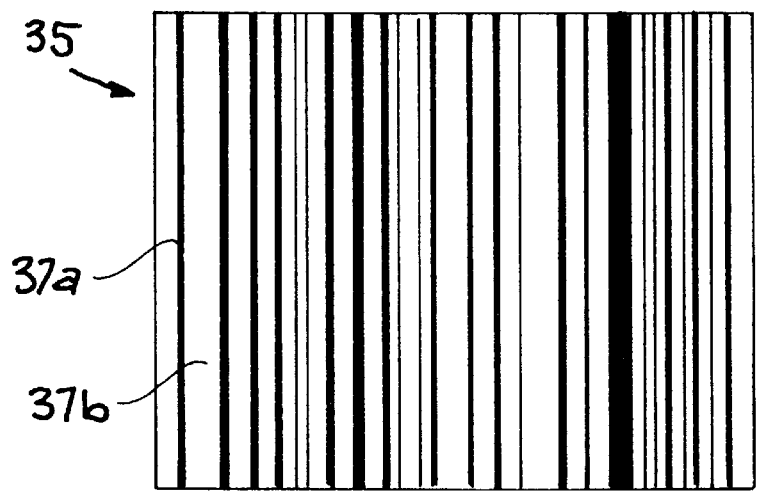
FIG. 5 shows an optical bar code element.

The optically bar coded target 30 consists of a ball lens 33 mounted in a support 34 which focuses the light beam 29 onto a bar code element 35 as shown in FIG. 4. The ball lens 30 is formed such that the radius of curvature of surface 33a where the light enters the ball is less than the radius of curvature of the opposite surface 33b. The radius of curvature of surface 33b is at the focal length of ball lens 33. Light passing through the bar code 35 is absorbed by a light absorber (plate) 36. The bar code 35 as shown in FIG. 5 consists of reflective bars 37a arranged to form a digital code on one side of a ball lens 33. The transparent spaces 37b between the reflective bars 37a allow the incident light to pass to absorber 36. Of course, where only presence of a target is to be detected, bar code 35 can be omitted and surface 33b made totally reflective.

Figure 6:
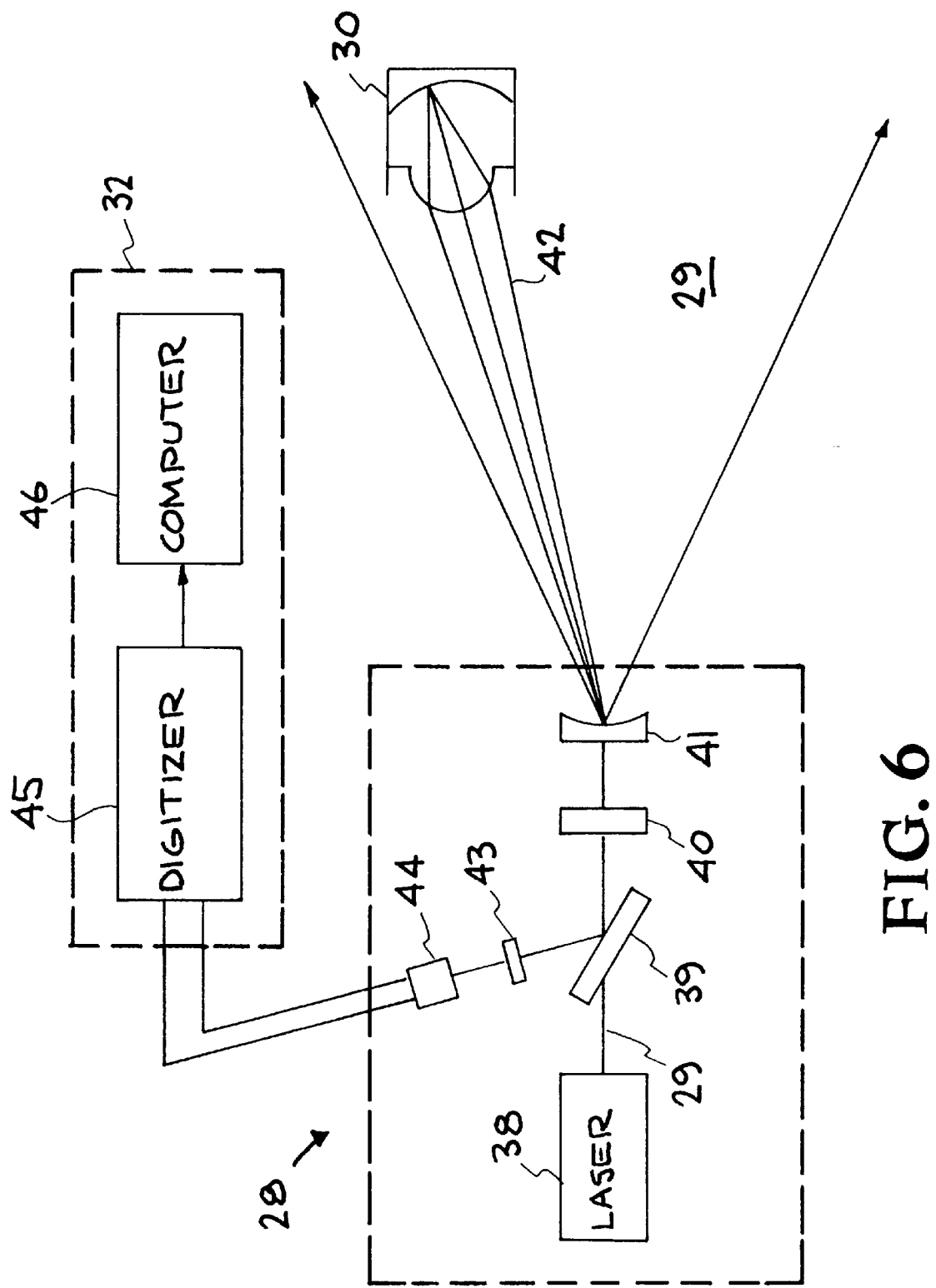
FIG. 6 shows an embodiment of the miniature laser tracker to illuminate an optically bar coded target.

The MLT 28 for interrogating an optical bar code 35 in a retroreflective target 30 consists of a laser 38, polarizer 39, quarter wave plate 40, diverging lens 41, an optical bandpass filter 43, a photodetector 44, a digitizer 45, and a computer 46 as shown in FIG. 6. The laser 38 produces an output beam 29 which can be either pulsed or continuous wave. A preferred laser is a diode laser. The output beam 29 can be randomly polarized but MLT 28 will operate most efficiently when the output beam is linearly polarized and oriented to pass through the polarizer 39. The beam passes through a linear polarizer 39 which is tilted relative to the beam direction. To minimize reflectivity loss, the polarizer 39 can be tilted at Brewster's angle. Only one orientation of linearly polarized light will pass through the polarizer 39. The beam then passes through a quarter wave plate 40 which converts the light from linearly polarized to circularly polarized. Next, a negative lens 41 diverges the beam 29 in both the vertical and horizontal dimensions. Lens 41 is used to control the divergence in both horizontal and vertical directions so that targets in a desired height range can be detected and so that a moving target will be in the field long enough to read information on the target.

The diverging light 29 is aimed across a location, e.g. a road, at a minimum and maximum height such that it will illuminate a variety of possible target locations on an object, e.g. license plate locations on a vehicle. The optically bar coded target 30 returns a portion 42 of the laser beam 29 exactly back on itself, i.e. it retro-reflects the beam. As the object 31 (e.g. a car) moves through the diverging beam 29, the angle of the light entering the ball lens 33 changes, causing the focus of that light to sweep across the bar code as shown in FIGS. 7A, B, C. FIG. 7A shows the target 30 just having entered the beam 29 so the beam is incident on one edge of the bar code element 35. FIG. 7B shows the target in about the center of the field, so the beam focus is on the center of the bar code element 35. FIG. 7C shows the target about to leave the beam 29, so the beam focus is on the other edge of the bar code element 35. Thus, as the target 30 has moved through the beam 29, the beam focus has swept across the length of the bar code element 35.

When the light focuses on reflective bars 37a, i.e. a reflective coating, some of the light 42 will be retro-reflected back to the tracker 28. When the light focuses between bars 37a in spaces 37b, the light will transmit out of the ball lens 33 and be absorbed by the absorbing plate 36, i.e. that portion of light 29 will not return to the tracker 28. Consequently, during the short time the object 31 is passing through the laser beam 29, the amplitude of light returning will modulate in time depending on the bar 37a arrangement in the bar code element 35 of the target 30 on that particular object (car) 31. Reflected light can be processed as a positive bit and no light returned as a negative bit of information.

When the beam 42 returns to the laser tracker 28, it retraces the path of the illuminating beam 29 to include converging when it passes back through lens 41 and changing back to linearly polarized light when it passes through the quarter-wave plate 40. However, because the light has been retro-reflected, the return beam 42 enters in the opposite direction as the illumination beam 29, so when it changes from circular to linear polarization it is 90 degrees out of phase with the illumination beam 29. Consequently, the reflected beam 42 does not have the right polarization to transmit back through the polarizer 39, reflecting to another path instead. This new path preferably contains an optical bandpass filter 43 which passes the laser light but rejects light of other wavelengths. The light transmitted through the filter illuminates a photodetector 44.

The photodetector 44 is very sensitive to light, so when light reflects from the optically bar coded target 30, a corresponding current is immediately generated. This current is digitized by an Analog to Digital converter (digitizer) 45 and fed into a computer 46 for analysis. When analyzing the digitized data, a current exceeding a pre-described current threshold will indicate a positive bit. No current will indicate a negative bit. The time duration of the bits will vary depending on several factors: the distance between the car and the tracker, the divergence angle of the laser beam, the speed of the car, and the number of bars on the bar code. For example, a car with a 100 bar code traveling at 60 mph and 30 feet from a tracker which is illuminating the car with a 45 degree diverging laser beam would generate a bit width of about 3.41 milliseconds (an illumination time of 341 milliseconds swept over 100 bits). Since some photodetectors can read changes in amplitude at greater than 1 GigaHertz bandwidth, a photodetector could easily read this modulation rate of less than one kiloHertz. Elaborating further on this example, a reflective bar width of 250 micrometers, would dictate that the bar code element would be one inch long. If the focal length of the ball lens was an inch, then the optically bar coded target could be about a one inch cube in size.

Figure 8A:
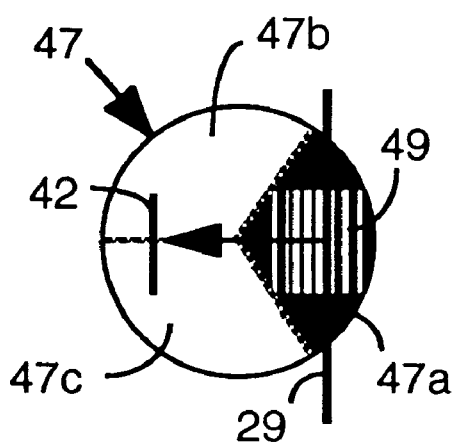
FIGS. 8A, 8B show front and side views of another embodiment of a retroreflector target containing an optical bar code.
Figure 8B:
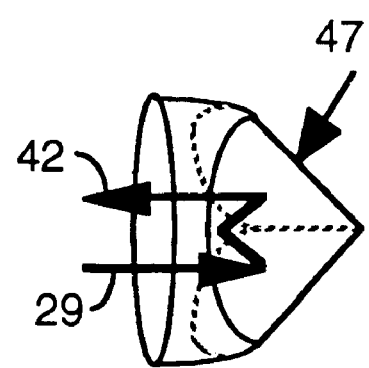

Another version of an optically bar coded target 30 is a corner cube 47 which has three reflecting surfaces 47 *a, b, c* as shown in FIGS. 8A, B. A corner cube is a common (but expensive) optical prism (or three-mirror) device which has the feature of returning a laser beam exactly back on itself (with a slight displacement), i.e. it retro-reflects the beam. On one reflective surface 47a of the corner cube 47 is a bar code 49 either marked, masked, or scribed into the prism (or mirror) surface. The dark bars of the bar code 49 will absorb the light and in-between the dark bars the light 29 will be reflected back to the laser tracker 28 as a reflected beam 42. Since the beam is retroreflected by the corner cube 47, the return beam 42 will contain the digital information of the bar code 49 as an amplitude modulated signal as the target moves through the beam. The beam 29 must have a width that is not greater than the bars of the bar code, i.e. wider bars will be easier to use. Thus beam 29 must be substantially a plane of light. The beam 29 must also be aligned with the bars so it does not cross several bars at once. Thus the tracker should be very close to the target to prevent beam divergence and misalignment problems.

Thus the optically bar coded retroreflective target of the invention can be utilized with a laser tracker for locating targets and providing information about the target. Modulations in a retroreflected beam from the bar coded target are sensed by a detection system where the data is processed to obtain information about the target. A moving target can move through a fixed tracker field or alternatively a scanned tracker field can be used to read a stationary target.

Changes and modifications in the specifically described embodiments can be carried out without departing from the scope of the invention, which is intended to be limited by the scope of the appended claims.

The invention claimed is:

1. A retroreflector target, comprising:
   a retroreflective optical device, wherein said retroreflective optical device is a corner cube device; and
   a bar code element formed on a reflective surface of said retroreflective optical device.

2. The retroreflector target of claim 1 wherein said corner cube comprises:
   a first reflective surface which receives incident rays of light;
   second and third reflective surfaces positioned such that light incident on said first reflective surface is reflected to said second and third reflective surfaces from which it is retroreflected back.

3. The retroreflector target of claim 2 wherein a bar code element is formed on said first reflective surface of said corner cube.

4. The retroreflector target of claim 3 wherein said bar code element comprises:
   a plurality of absorber bars which absorb incident light; and
   reflective spaces between each absorber bar of said plurality of absorber bars wherein said reflective spaces reflect incident light.

* * * * *